Dec. 14, 1954      J. K. SHANNON      2,697,129
CLOSURE AND VENT FOR BATTERIES
Filed March 19, 1953      2 Sheets-Sheet 1
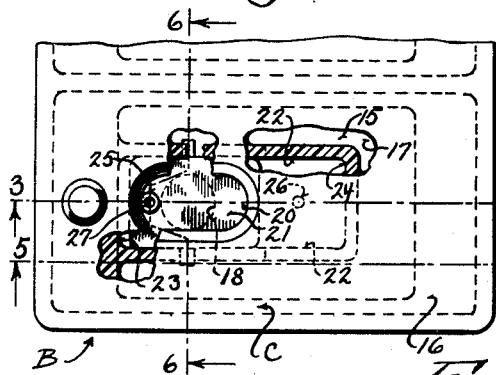
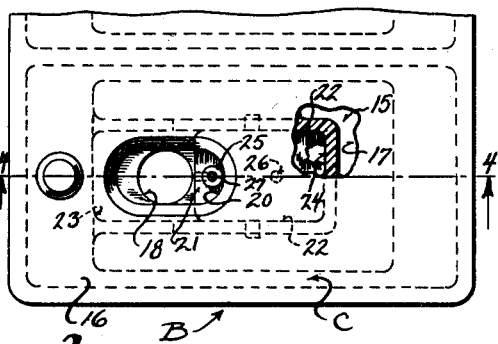
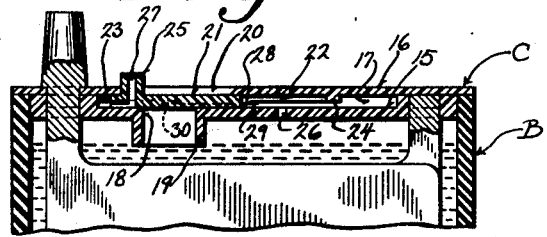
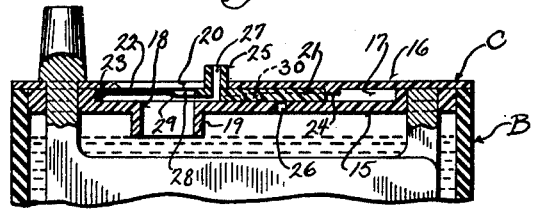
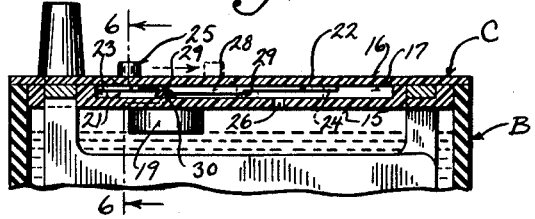
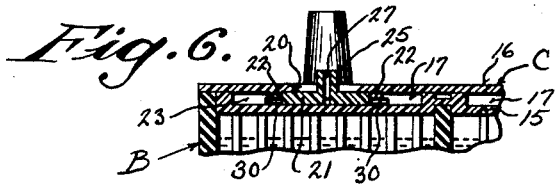
INVENTOR
JOHN K. SHANNON
BY
ATTORNEYS Dec. 14, 1954

J. K. SHANNON 2,697,129

CLOSURE AND VENT FOR BATTERIES

Filed March 19, 1953

INVENTOR
JOHN K. SHANNON

BY

ATTORNEYS

United States Patent Office 2,697,129
Patented Dec. 14, 1954

2,697,129

CLOSURE AND VENT FOR BATTERIES

John K. Shannon, Kenosha, Wis.

Application March 19, 1953, Serial No. 343,450

2 Claims. (Cl. 136—178)

This invention appertains to storage batteries and more particularly to closures for the venting and filling openings of storage battery covers.

In general storage battery practice; the covers of the storage batteries are provided with filling openings and these openings are in turn closed by removable vented plugs. In order to fill the battery with electrolyte or to test the electrolyte or the amount thereof in a battery, it is necessary to unthread these plugs from the walls of the openings. This not only requires time, but danger of losing the plugs is always present. In the machine filling of the batteries during manufacture and the replenishing of water from time to time during use of the battery, the battery is liable to be over-filled (there being a desired electrolyte level in batteries).

It is, therefore, one of the primary objects of this invention to provide a novel closure for the filling openings of storage batteries, which is associated with the battery cover at all times and which can be moved to open and close the filling opening by the mere operation of a finger.

Another salient object of the invention is to provide novel means for insuring the proper venting of the battery when the closures are in their closed positions and for providing condensation chambers constituting a part of the venting means for insuring the dripping of water of condensation back into the battery.

A further object of my invention is the provision of means for closing the venting openings when the closures are in their open position for filling the battery, whereby when the electrolyte reaches a certain level and to the depending thimbles surrounding the filling openings, further filling of the battery will be automatically stopped and excess electrolyte will merely rise in the filling openings indicating further supply of electrolyte should be stopped.

A still further object of my invention is to provide means for holding the closures in their opened or closed positions against accidental movement.

With these and other objects in view, the invention consists in the novel arrangement, construction and formation of parts, as will be hereinafter more specifically described and claimed, and illustrated in the accompanying drawings, in which drawings:

Figure 1 is a fragmentary top plan view of a cover constructed in accordance with my invention, applied to a battery and showing one of my improved closures, the closure being shown in its closed venting position, parts of the view being shown broken away and in section to illustrate structural detail.

Figure 2 is a view similar to Figure 1, but showing the closure in its open position.

Figure 3 is a fragmentary vertical sectional view taken on the line 3—3 of Figure 1, looking in the direction of the arrows, and showing the closure in its closed venting position.

Figure 4 is a similar sectional view, but taken on the line 4—4 of Figure 2, looking in the direction of the arrows, and showing the closure in its open position for filling and with the vent closed.

Figure 5 is a sectional view similar to Figure 3 but taken on the line 5—5 of Figure 1, looking in the direction of the arrows illustrating the means employed for holding the closure in its opened or closed position against accidental movement.

Figure 6 is a sectional view taken at right angles to Figure 5 and on the line 6—6 of Figure 5, looking in the direction of the arrows.

Referring to the drawings in detail, wherein similar reference characters designate corresponding parts throughout the several views, the letter B generally indicates a storage battery and C the cover therefor.

Figure 7:
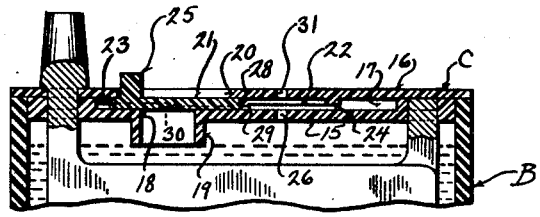
Figure 7 is a fragmentary sectional view similar to Figure 3, but showing a slightly modified form of the invention.

The battery B can be of a type now found on the open market and will not be described in detail.

The cover C is formed from dielectric material and preferably of thermoplastic, and is of a general character shown in the Shannon and Schmit Patent No. 2,618,673, issued November 18, 1952. In this patent mold cavities were shown for the connecting straps of the lugs of battery plates, and this cover was preferably, but not necessarily, formed in upper and lower plates or sections heat sealed together to form a homogeneous or unitary cover structure. In this present invention, the cover C can be formed in the same manner, and hence includes a lower plate section 15 and an upper plate section 16, united by heat sealing or other method to form the desirable unitary structure. In accordance with this invention, interior cavities 17 are formed between the plates 15 and 16 above each battery cell and these cavities 17 constitute condensation chambers, as will later appear. Extending through the cavities 17 are filling openings 18 for the cells of a battery and the openings 18 are surrounded by depending thimbles or skirts 19, for a purpose which will also later appear. The openings 18 open out through the upper face of the cover, and each opening at this point is enlarged, as at 20. A closure gate 21 is provided for each opening 18 and the gate can be mounted either for sliding movement or swinging movement over and away from an opening 18. In the present instance the closure gate 21 is slidably mounted toward and away from its opening 18 between the plates 15 and 16 of the cover C. To guide the closure in its sliding movement, the upper wall of the cavity, namely, the lower face of the plate 16, is provided with depending spaced parallel longitudinally extending guide tracks 22. These guide tracks are spaced apart a distance equal to the width of the closure 21, and stop walls 23 and 24 can be provided at the ends of the tracks. Thus, the closure 21 is effectively guided in its sliding movement back and forth and is limited in such sliding movement. Formed on the closure is an upstanding manipulating finger piece 25 and by grasping the finger piece, the closure can be moved over or across the opening 18 or completely away from the opening.

In order to bring about the venting of the battery B when the closure 21 is over the opening 18 the lower wall of the cavity 17 or the plate 15 is provided with a vent opening 26. As the guide tracks 22 are above the lower wall of the cavity, a circulation of air can take place in the cavity around the closure 21. The closure itself is provided with a vent opening 27 which communicates with the cavity and opens out into the atmosphere through the finger piece 25.

By referring to Figure 4, it can be seen that when the closure plate 21 is in its open position away from the filling opening 18, that the same closes the vent opening 26 in the cover.

Means is provided for holding the closure 21 against accidental movement both in its open position and in its closed position. In the present instance, this as accomplished by providing ribs 28 on the lower face of the tracks 22 for a portion of their lengths, and these ribs define stop shoulders 29 at their terminals. The closure 21 is provided with laterally extending pins 30 which ride under the ribs during the sliding of the closure. When the closure is in its fully closed position, the pins 30 engage the forward stop shoulders 29, and when the closure is in its fully opened position, the pins 30 engage the rear stop shoulders 29.

As heretofore brought out, the cavities 17 constitute condensation chambers for each cell, and obviously, during the venting of a cell condensation can collect in each cavity and drain back into a cell through a vent opening 26. With the closure in its closed position the venting of the battery is through the vent openings 26 into the cavities 17, around the closure and through the vent 27. With the closure 21 open for filling or testing the battery the vent opening 26 is closed, as heretofore stated. Considering that the electrolyte is being introduced into a cell, it can be seen that as the liquid level reaches the thimble or skirt 19, a cell will be closed and additional water or electrolyte will merely rise in the thimble, preventing over-filling of a cell. This is caused by the trapping of the air in the cell.

Obviously, the closure can take various forms and the venting of a cell of a battery can be brought about in different manners.

Figure 8:
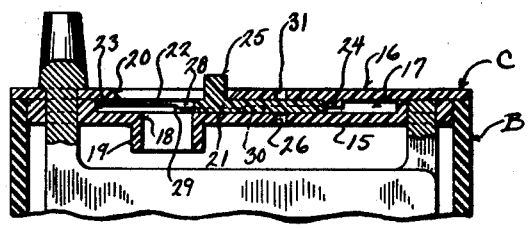
Figure 8 is a view similar to Figure 7 and showing the closure of the modified form in its open position.

In Figures 7 and 8, I have shown a slightly modified means for venting a cell, and in this form the upper wall of the cavities 17 or the top plate 15 of the cover C, can be provided with a vent opening 31 directly above the vent opening 26 and the vent opening 27 in the closure 21 can be eliminated. As best shown in Figure 7, when the closure 21 is over the opening 18, the venting of a cell will take place through opening 26, cavity 17 and through opening 31. When the closure 21 is in its open position both openings 26 and 31 are closed.

Figure 9:
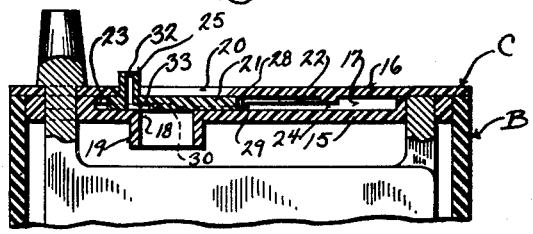
Figure 9 is a sectional view similar to Figure 7 but showing a still further modified form of my invention.
Figure 10:
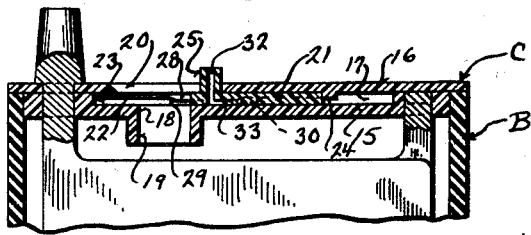
Figure 10 is a view similar to Figure 9, but showing the closure of the still further modified form in its open position.

In Figures 9 and 10, the closure 21 is provided with a vent port 32 in the manipulating finger piece 25, and the lower end of this port is provided with a lateral passageway 33 extending back toward the transverse center of the cover and this passageway opens out through the lower face of the closure. The cover itself in this instance, is not provided with any vent openings. As shown in Figure 9, with the closure 21 across the opening 18, the passageway 33 communicates with the opening and allows the venting of a cell through vent port 32. When the closure 21 is open, as shown in Figure 10, the lateral passageway 33, and consequently the port 32, is closed.

From the foregoing description, it can be seen that I have provided a simple closure for the filling openings of batteries, and with the closure so arranged relative to the cover that venting of the cells is assured when the filling openings are closed. Great stress is laid on the electrolyte level control during filling, and the fact that the vent for each cell is closed when a filling opening is uncovered.

Various changes in details may be made without departing from the spirit or the scope of this invention, but what I claim as new is:

1. In a storage battery, a cover having a condensation chamber therein and a filling opening opening out to the atmosphere through the chamber; and a closure movable in the chamber over the opening for closing the same and away from the opening for filling the battery, and means for venting through the cover when the closure is in its closed position and means for preventing said venting when the closure is in its open position.

2. In a battery, a cover having an interior condensation chamber and a filling opening opening out into the atmosphere through the chamber, the upper wall of the condensation chamber having a guide track, a sliding closure in said chamber guided by said track and movable over the filling opening for sealing the same and away from the filling opening for opening the same, said cover having a vent opening communicating with the chamber adapted to be closed by said closure when said closure is in its open position away from the filling opening.

References Cited in the file of this patent

UNITED STATES PATENTS

| Number | Name | Date |
|---|---|---|
| 1,269,096 | Land | June 11, 1918 |
| 1,378,549 | Manchester et al. | May 17, 1921 |
| 2,220,005 | Smith | Oct. 29, 1940 |
| 2,506,952 | Doughty | May 9, 1950 |